(12) United States Patent
Ledbetter

(10) Patent No.: US 8,006,371 B1
(45) Date of Patent: Aug. 30, 2011

(54) METHOD FOR REMOTELY OPERATING A SWITCH

(76) Inventor: Finley Lee Ledbetter, Argyle, TX (US)

( * ) Notice: Subject to any disclaimer, the term of this patent is extended or adjusted under 35 U.S.C. 154(b) by 429 days.

(21) Appl. No.: 12/361,234

(22) Filed: Jan. 28, 2009

(51) Int. Cl.
*H01H 11/00* (2006.01)
*H01H 65/00* (2006.01)

(52) U.S. Cl. .......................... 29/622; 29/876

(58) Field of Classification Search ............ 29/622, 29/874, 876; 200/50.21, 50.24, 200, 296
See application file for complete search history.

(56) References Cited

U.S. PATENT DOCUMENTS

| 5,477,017 | A | 12/1995 | Swindler et al. |
| 6,777,627 | B1 | 8/2004 | Stevenson |
| 6,897,388 | B2 | 5/2005 | Greer |
| 6,951,990 | B1 | 10/2005 | Miller |
| 7,019,230 | B1 | 3/2006 | Vaill et al. |
| 7,825,344 | B2 * | 11/2010 | Stevenson .................. 200/50.24 |

* cited by examiner

*Primary Examiner* — Thiem Phan
(74) *Attorney, Agent, or Firm* — Buskop Law Group, PC; Wendy Buskop

(57) ABSTRACT

A method for temporarily connecting an actuator near a switch for remotely operating the switch. The method further contemplates using a portable remote switch operator for temporarily connecting an operator or a human, to engage a switch that does not place a human in danger when turning on a high voltage switch.

17 Claims, 4 Drawing Sheets

METHOD FOR REMOTELY OPERATING A SWITCH

FIELD

The present embodiments generally relate to a method for temporarily connecting an actuator adjacent an electrical switch and remotely operating the switch using the actuator.

BACKGROUND

A need exists for a method for attaching an actuator temporarily near a switch, such as with magnets, to operate an electrical switch remotely, such as an electrical protective device without putting the operator in harms way of an electric shock.

A need exists for a method to operate a high voltage switch using a light weight, portable unit that is able to work with at least three different types of actuators, rotary, push, and push pull actuators for remotely and removably operating circuit breakers or other types of devices, that if manually operated by a human, could shock or burn them and potentially kill the operator.

The present embodiments meet these needs.

BRIEF DESCRIPTION OF THE DRAWINGS

The detailed description will be better understood in conjunction with the accompanying drawings as follows.

Figure 1:
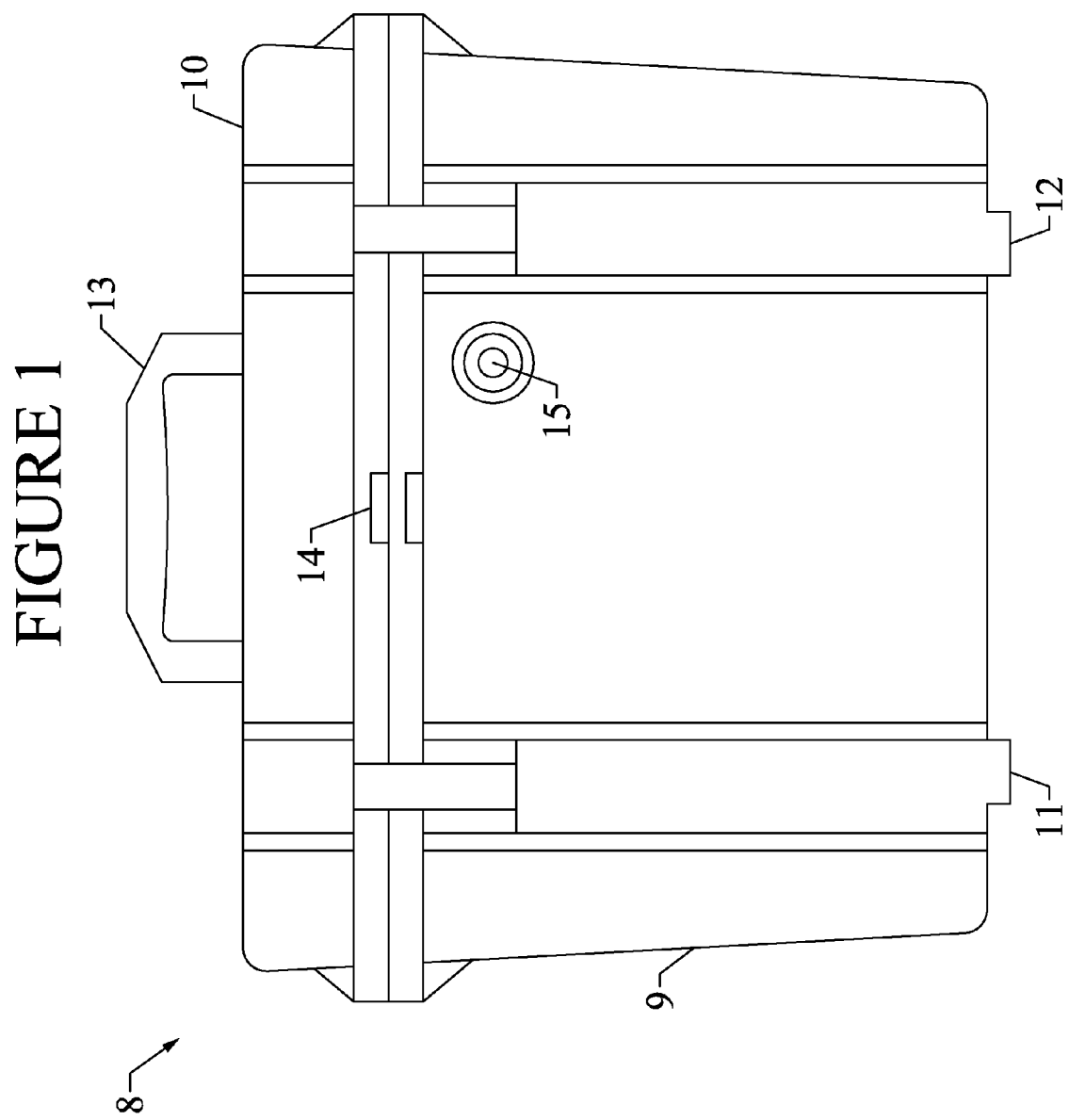
FIG. 1 is a front view of a housing usable in this method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for operating a switch that does not place a human in danger when turning on a high voltage switch. The method further contemplates using a portable remote switch operator for temporarily connecting an operator or a human, to engage a switch.

The method contemplates using a portable remote switch operator, which is referred to herein as the "RSO". The RSO to be used in the method can include an on-board power supply, such as a set of sealed lead batteries. The on-board power supply can be, in another embodiment a fuel cell. The power supply can be a set, such as a pair, of lithium ion batteries connected in series or in parallel. The power supply can have its own controller which can operate to continuously balance the lithium ion batteries enabling the power supply to be operable for very long periods of time.

At least two batteries can be contemplated as usable herein. In an embodiment, the invention can include from about 4 batteries to about 10 batteries. The batteries can provide 24 volts of power.

The power supply can be contained within a portable, weather resistant housing that can have a body portion and a sealable lid. The sealable lid can have at least one handle for carrying. The body portion can have one or two handles for enabling the housing to be carried by an operator. It is contemplated that the RSO can be moved by a single operator.

The on-board power supply can be a 24 volt power supply, NiCad sealed batteries, connected in series or in parallel. Each battery can have a voltage of about 12 volts if only two batteries are used, and between about 4 volts to about 12 volts, depending on how many batteries are used in the housing.

The housing can be made of plastic, or another shock resistant material.

The method can contemplate using the RSO to temporarily place an actuator adjacent a switch, then using a remote control, actuating the actuator using the on-board power supply of the RSO to turn on or off the switch, safely, and then recharge the on-board power supply after operation.

The RSO can be contemplated to having the following components:

The RSO can include a housing body portion that can have feet, or two bars across the bottom to provide a slight elevation for the housing from the floor, which can enable the housing to be elevated over a puddle of water, or similar problem. The body portion can provide interlocking feet, enabling multiple body portions to be stackable one on top of the other.

The RSO can include a sealable lid that can be hinged to the body portion. The sealable lid can be connected to the body portion with at least two fasteners if the lid is not hinged. A rotatable pin can be used to secure the lid to the body portion, provided the body portion has at least two recesses formed in the lid to accept the pin. The sealable lid can be made from the same material as the body portion, which can be Polyvinyl chloride, metal or even blends of homopolymer and copolymers of polyethylene and polypropylene, which can allow a transparency in the body portion, allowing the operator to view the status of the contents of the body portion.

The sealable lid can be locked to the body portion with typical locking devices.

The body portion, usable in the method can have four walls and a bottom. The sealable lid can be made from a thermoplastic that can be impact resistant, with a high durometer. The sealable lid can be sealable with a sealing means, such as an O-ring, another elastomeric sealing device, or another sealing means that provides a weather resistant seal.

In an embodiment, an atmospheric seal can be disposed through a wall in the body portion for providing pressure relief within the housing. The atmospheric valve can be a pressure relief valve. In an embodiment, the pressure relief valve can operate when the pressure in the housing exceeds about 1 atm within the housing with the sealable lid secured to the body portion.

A charger can be located within the body portion and can further be connected to the on-board power supply. The charger can further have a plug positioned in at least one wall of the housing or in a face plate positioned in the housing enabling the charger to be connected to about a 110 volt to about 220 volt external power supply. A usable charger herein can be a JAC0224 charger made by Shaur, and it can further be known as a "trickle charger".

The housing can contain a control system connected to the power supply and to an actuator connection and to a remote control connection for enabling an operator to use a remote connection to turn on, turn off, or otherwise remotely control an actuator.

The body portion of the housing can be contemplated to have a length between about 12 inches to about 18 inches, a width between about 6 inches to about 12 inches and a height between about 12 to about 16 inches.

In an embodiment the housing can be within a second housing to insure insulation and protection of the RSO, particularly in a harsh environment, such as under water.

Within the housing can be a face plate. In an embodiment, the face place can be positioned over the power supply and between the body portion and the sealable lid. The face place can be contemplated to have a plurality of openings. A first opening can support an on/off switch, which can enable the on-board power supply to supply power to an actuator, a portable remote control or both items.

A second opening can contain the plug for the charger. This second opening can also be grounded and contain a ground plug.

A third opening in the face plate can support an actuator connection, which can enable an actuator connector to be plugged into the RSO. The actuator connection can be an amphenol or a mill spec. connection. The connection can be a watertight, sealable connection that can be supported with an aluminum threaded engagement. The actuator connector can connect an actuator to the on-board power supply and the control system.

A fourth opening can support a circuit breaker, such as a 10 amp 250 volt AC circuit breaker, or a thermo/magnetic circuit breaker, such as those available from Eaton of Milwaukee.

The face plate can be made from a steel plate, that can be solid steel or hollow steel.

The face plate can further be contemplated to have a thickness of between about 12 inches to about 14 inches and have a length ranging from about 40 percent to about 60 percent of the length of the housing, and a width of up to about the interior of the housing.

The face plate can be supported in the housing and can be held in place by at least one fastener.

The housing can be made from 14 gauge cold rolled steel that can further be powder coated to reduce cationic effects. The steel can also be powder coated to reduce shocking of an operator or reduce build up of electrostatic forces.

The RSO actuator connection can engage a remote switch actuator "RSA" connector that can be a coiled wire that can be insulated and runs from the third opening with the actuator connection to an actuator. The RSA connector can be in communication with the control system of the RSO so that the operator can turn an actuator on, off, or turn the actuator on and then, after a predetermined interval, the control system can automatically shut off the actuator.

The remote control connection can engage a RSO remote control connector that can be a coiled wire that can be insulated and runs from the housing to a portable remote control operable by a user, namely a human, from a safe distance from the RSO, such as about 50 feet to about 100 feet from the unit. The remote control connector can provide power to the portable remote control, transmit signals from the portable remote control to the actuator, or both.

The remote control connector can provide a signal to the control system that communicates using the actuator connector to signal an actuator to rotate, pull, or push and pull along a given axis thereby turning off, turning on, or periodically turning on and off a switch.

The RSA connector in an embodiment can have a multi-pin connection for providing both power and control signals from the control system and the on-board power supply to the actuator.

Similarly, the remote control connector can have a remote control multi-pin connection for providing both power and control signals from the control system and the on-board power supply to the portable remote control.

The multi-pin connection can have at least 2 pins, with each pin having a different polarity. The pins supply power to the actuator or to the portable remote control.

The actuators can have actuator motors that are operable via the actuator connector to the on-board power supply.

The actuators can be supported on a temporary actuator fastener that can temporarily support the actuator adjacent to, around, or in proximity to a target switch for actuation. The target switch can be a circuit breaker.

The temporary actuator fastener can be a set of magnets that hold the actuator to metal near the switch. The temporary actuator fastener can be a powder coated metal bracket such as a two part metal U-shaped bracket has a first part that slides to a second removable bracket for supporting a push actuator around the target switch.

In another embodiment, the temporary actuator fastener can be an L-shaped bracket, which can be made from metal or plastic for supporting a rotating actuator that can be clipped to metal around a target switch.

If the actuator is supported by a bracket as the temporary actuator fastener, it is contemplated that the bracket can be plastic or metal, coated or uncoated, perforated, hollow or solid, and always, non-deformable when pressure is exerted on the bracket.

In still another embodiment, the temporary actuator fastener can be a strap, a clamp, at least one hook, or combinations of these. The fasteners can be capable of supporting at least 20 pounds of weight. In the strap embodiment, the strap can be metallic, adjustable and flexible. In the hook embodiment, the hooks can be made from steel.

The actuator usable in this system can be a rotary actuator, such as a CBS ArcSafe Inc. RSA 1 rotary actuator from Denton, Tex. The actuator usable in this system can also be a push actuator, such as a RSA-2 push actuator, also available from CBS ArcSafe Inc. The actuator can be a push pull actuator, such as an RSA-3 push pull actuator.

A usable rotary actuator can include a motor. A shaft can be connected to the motor. A lever arm can be connected to the shaft. The lever arm rotates on the shaft and operates a switch, such as a circuit breaker, a valve, or a transformer.

A usable linear actuator can include a small motor. A screw drive operable by the small motor that causes a rod with a connector to grab a switch, and then extend or retract along a linear axis, pushing or pulling the switch, which can be a lever. The connector of the actuator can be a hook to engage the switch removably, a snap ring to removably engage the switch, a chain for removably engaging the switch or even a magnet to removably engage the switch while enabling the actuator to operate the switch.

A push actuator can include a solenoid that pushes a rod. The rod can have a pad for depressing button. The rod can have a retractable biasing means, such as a spring, or a second magnet for connecting to a first magnet on the rod, or an electromagnetic means that causes the rod to retract on a command signal. The retractable biasing means can allow the rod to return to its original position releasing a latch, releasing a button rather than operating a switch, or setting a latch, or depressing a spring.

It is contemplated in an embodiment of the method, the actuator, portable remote control, housing and lid, and the connectors together weigh less than 100 pounds for complete portability.

In an embodiment, it can be contemplated that the actuator can be controlled from the portable remote control using a wireless connection. The portable remote control can have a transmitter like a cell phone, that communicates to the control system in the housing a wireless connection that in turn, communicates to a wireless receiver on the actuator. Power would still need to be supplied to the actuator from the on-board power supply.

It is possible that a radio controller can be used with a very low frequency as the remote control, when transmission is needed through walls.

The RSO can be contemplated to be modular and easily reparable. The embodiments provide the benefit that it can prevent humans from receiving shocks and burns and even eliminate accidental deaths, due to the severity.

The RSO can be operated by human, but can also be operable by a robot. The benefits of using a robot can make the system a more accurate and dependable operation.

In an embodiment, the actuator connector and/or the remote control connector can be retractile cords.

FIG. 1 shows a front view of the housing 8 of the portable remote switch operator "RSO". The housing has a body portion 9 and a sealable lid 10. The sealable lid shown in FIG. 1 can be about 16 inches wide and about 12.5 inches high. The body portion 9 can have an integral first foot 11 and an integral second foot 12. A handle 13 is shown connected to the sealable lid 10, which can be removable. The sealable lid 10 can have a closure 14 for locking the sealable lid 10 to the body portion 9.

FIG. 1 also shows the atmospheric valve 15, which can be used as a pressure relief valve for situations when the pressure in the housing 8 with the sealable lid 10 fastened exceeds 1 atm.

Figure 2:
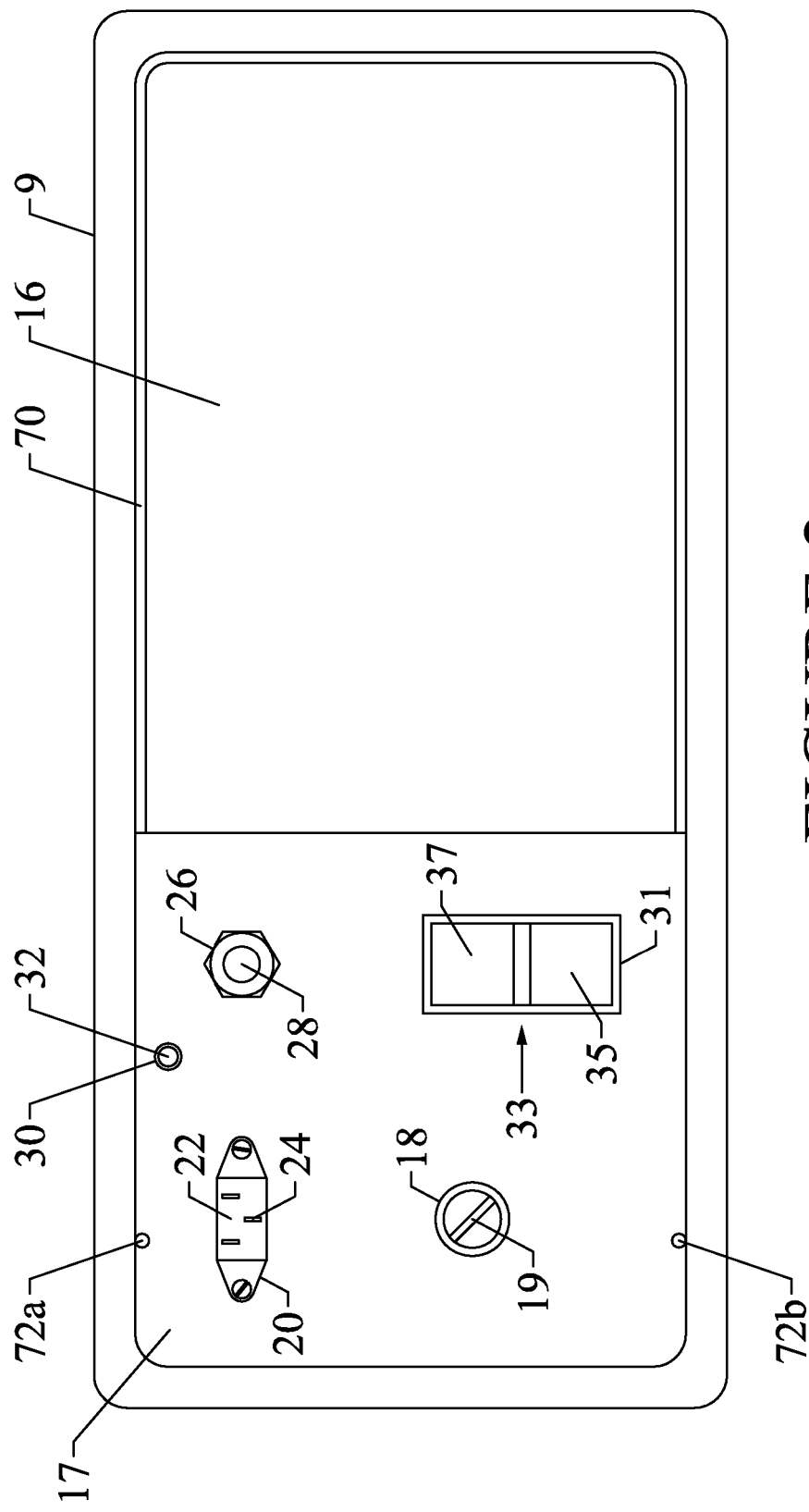
FIG. 2 is a top view of the face plate disposed on the housing.

FIG. 2 is a top view of the body portion 9 which provides a storage space 16. A face plate 17 is shown at least partially positioned over the storage space 16 between the storage space 16 and the body portion 9.

The face plate 17 can have a first opening 18 that contains an on/off switch 19, as shown in this Figure. The face plate 17 can have a second opening 20 for supporting a plug 22 and ground plug 24, which is shown in positioned in the face plate.

A third opening 26 in the face plate 17 can support and actuator connection 28. The face plate 17 can have a fourth opening 30, which can support a circuit breaker 32. In addition, the face plate 17 can further have a fifth opening 31, which can support a switch 33 with an open position 37 and a closed position 35.

FIG. 2 further shows the body portion 9 having a ridge 70, which can be used for supporting face plate 17 with a side plate 74. A first fastener 72a and a second fastener 72b can be used to secure the face plate 17 to the ridge 70. Securing the face plate 17 can further be secured using screws.

Figure 3:
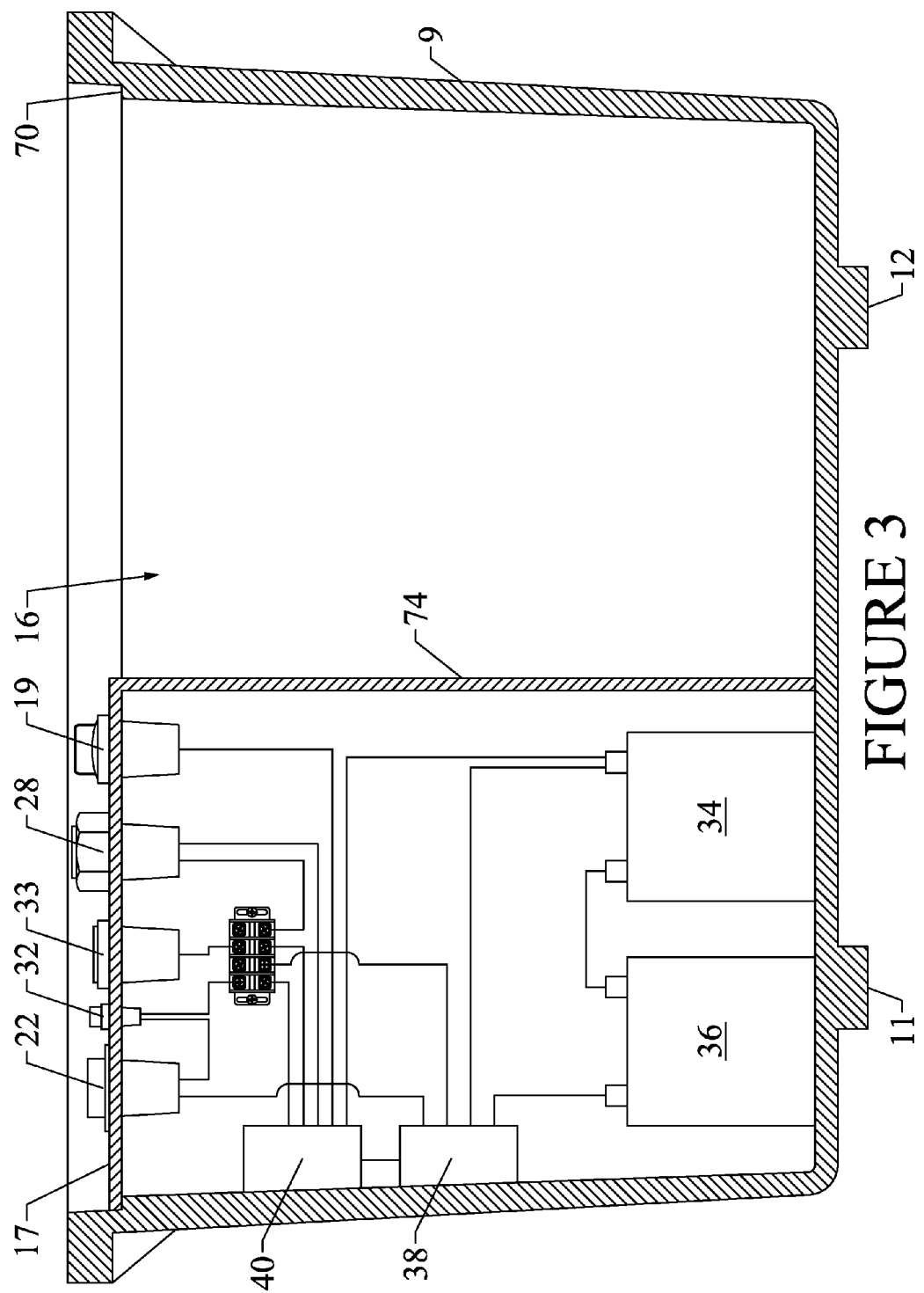
FIG. 3 is a cross sectional view of the body portion with components contained therein usable in the method.

FIG. 3 shows a side view of the body portion 9 with the face plate 17 positioned over the on-board power supply, and only partway across the storage space 16.

The on-board power supply can be 24 volt power supply, such as a 12 volt battery connected to a second 12 volt battery. The on-board power supply can be any number of batteries connected in a series or parallel.

The on-board power supply, shown in FIG. 3 has a first battery 35 connected to a second battery 26. The on-board power supply can further be connected to a charger 38 that can connect to the plug 22, which can enable the charger to receive about 120 volts to about 220 volts current from a source of power that is not part of the RSO.

A control system 40 can communicate with the charger 38, the on-board power supply (first battery 34 and second battery 36), the on/off switch 19, as well as the actuator connector 28.

Switch 33 can communication with control system 40. The control system 40 can have computer instructions to apply ground to the RSA.

Figure 4:
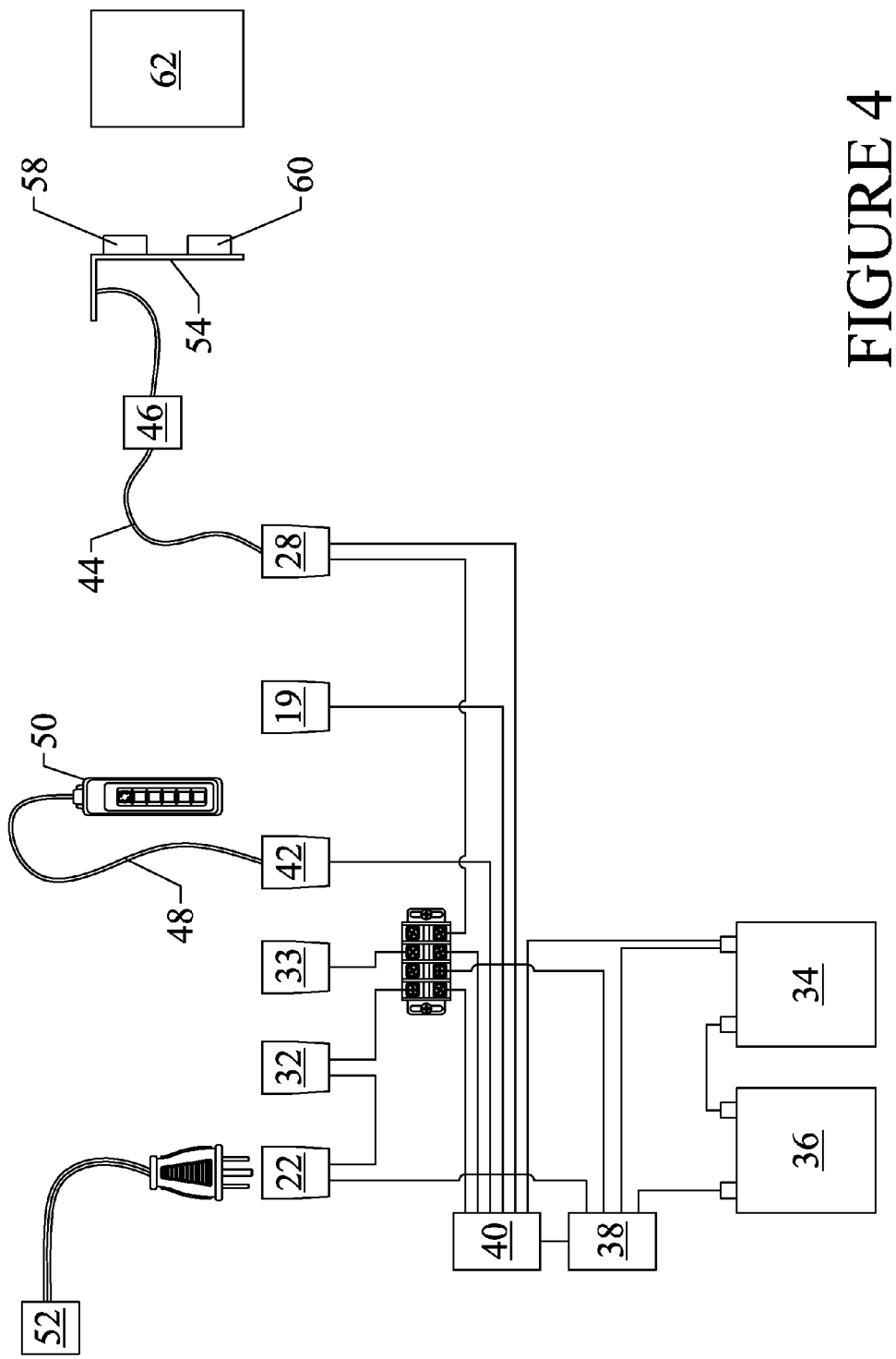
FIG. 4 is a schematic of the components that can be used in the method.

FIG. 4 is a schematic diagram of the first battery 34 and the second battery 36. First battery 34 is shown connected to the control system 40. The charger 38 can be in communication with a circuit breaker 32.

The control system 30 can be connected to the remote control connection 42. A remote control connector 48 can communicate between the remote control connection 42 and a portable remote control 50. The control system 40 can be in further communication with the actuator connection 28 that can use a multi-pin connector to engage an actuator connector 44 that can communicate with an actuator 46.

The control system 40 can also communicate with the on/off switch 19.

The circuit breaker 32 not only can be connected to the charger 38, but can also connects to the plug 22 that can receive the 120 volt AC current from an outside power source 52.

In FIG. 4, the actuator 46 is shown attached to a temporary actuator fastener 54 which is shown as an L-shaped bracket with a first magnet 58 and a second magnet 60 for securing on either side of the target switch 62.

While these embodiments have been described with emphasis on the embodiments, it should be understood that within the scope of the appended claims, the embodiments might be practiced other than as specifically described herein.

What is claimed is:

1. A method for temporarily connecting an actuator near a high voltage switch for remotely operating the high voltage switch, wherein the method comprises:
   a. using a portable remote switch operator "RSO" to removably and temporarily place an actuator adjacent a switch;
   b. using the actuator connector to connect the actuator to a housing with an on-board power supply and a control system;
   c. using a remote control in communication with the control system to actuate the actuator with the on-board power supply of the RSO to turn on or off the switch; and
   d. recharging the on-board power supply after actuation, wherein the ROS comprises:
      a housing comprising a body portion and a sealable lid forming a storage space;
      an on-board power supply disposed within the housing;
      an atmospheric relief valve disposed through the housing;
      a charger connected to the power supply;
      a control system connected to the charger;
      a face plate disposed over the on-board power supply, control system and charger, wherein the face plate supports:
         an on/off switch connected to the power supply;
         a plug for connecting the charger to receive current from an outside source;
         an actuator connection in connection to the control system; and
         a circuit breaker in connection with the charger;
      a remote control connector communicating with the control system;
      a portable remote control communicating with the remote control connector;
      an actuator connector communicating with the control system;
      an actuator connected to the actuator connector; and a temporary actuator fastener for holding the actuator in proximity to a target switch.

2. The method of claim 1, further comprising using a face plate to support the on/off switch, the plug for providing current to the charger, the circuit breaker and the actuator connection.

3. The method of claim 2, further comprising using the face plate to support a remote control connection for engaging the remote control connector.

4. The method of claim 1, further comprising releasing pressure from the housing when pressure in the housing exceeds 1 atmosphere.

5. The method of claim 1, wherein the actuator is a rotary actuator, a push actuator or a push-pull actuator.

6. The method of claim 1, further comprising using retractile cords connected to the control system as the actuator connector, the remote control connector or combinations thereof.

7. The method of claim 1, comprising using a wireless receiving and transmitting device for communicating between the actuator and the controller and between the remote control and the control system.

8. The method of claim 7, wherein the wireless transmitting and receiving uses low frequency radio signals that can transmit signals through walls.

9. The method of claim 1, comprising the step of supporting the at least one actuator using a temporary actuator fastener that is a bracket.

10. The method of claim 9, wherein the bracket is an L-shaped bracket or a U-shaped bracket.

11. The method of claim 1, comprising the step of supporting the at least one actuator using at least one magnet, a hook, a strap, a clamp, or combinations thereof.

12. The method of claim 1, wherein the on-board power supply comprises at least two NiCad sealed batteries connected in series and in parallel.

13. The method of claim 1, further wherein the equipment used in the method weighs less than 100 pounds.

14. The method of claim 1, wherein the housing is a weather resistant housing.

15. The method of claim 1, wherein the sealable lid is hinged to the body portion.

16. The method of claim 1, further comprising using as the actuator connection, the remote connection or combinations thereof, a multi-pin connector with at least two pins and each pin has a different polarity and at least one of the pins supplies power.

17. The method of claim 1, wherein the portable remote switch operator "RSO" further comprises a side plate.

* * * * *